United States Patent [19]
Steinhilber

[11] 4,191,078

[45] Mar. 4, 1980

[54] WIRE CUTTING FLYING SHEAR

[75] Inventor: Wilhelm A. Steinhilber, Guilford, Conn.

[73] Assignee: Orion Machinery & Engineering Corp., Branford, Conn.

[21] Appl. No.: 875,076

[22] Filed: Feb. 3, 1978

[51] Int. Cl.² ............................................. B23D 25/04
[52] U.S. Cl. ..................................................... 83/320
[58] Field of Search ........................... 83/320, 292, 293

[56] References Cited

U.S. PATENT DOCUMENTS

| | | | |
|---|---|---|---|
| 3,078,751 | 2/1963 | Hill | 83/293 X |
| 3,152,502 | 10/1964 | Rybak et al. | 83/292 X |
| 3,827,323 | 8/1974 | Jacobs | 83/320 X |
| 3,859,881 | 1/1975 | Hawley | 83/320 |
| 3,915,041 | 10/1975 | Trofimov et al. | 83/320 |

FOREIGN PATENT DOCUMENTS 568533  3/1924  France ........................................ 83/320

*Primary Examiner*—J. M. Meister
*Attorney, Agent, or Firm*—McCormick, Paulding & Huber

[57] ABSTRACT

A flying shear for use in a wire cutting-off machine has a cutter head reciprocated along an axis parallel to the path of wire feed. A knife equipped cutoff slide carried by the head moves perpendicular to the path of wire feed and, in cooperation with a cutoff bushing carried by the head, cuts the wire while the head moves in the same direction as the wire to produce a clean cut with little or no marring of the wire surface. The head and the slide are driven by a common drive mechanism, using a single eccentrically driven lever, located entirely above the cutoff bushing to minimize the possibility of its becoming fouled by metal particles and other debris at the cutting zone.

2 Claims, 9 Drawing Figures

WIRE CUTTING FLYING SHEAR

BACKGROUND OF THE INVENTION

This invention relates to machines for cutting long indefinite lengths of wire into shorter length pieces, and deals more particularly with an improved flying shear for use in such a machine.

Wire cutting-off machines are commonly used to cut wire from spools, swifts, drawing machines and other sources of relatively continuous supply into pieces of generally uniform length for use by other machines in making screws, nails, welding rods and a host of other articles. In such a cutting-off machine it is also well-known to use a flying shear as the actual cutting mechanism, such shear having a knife which is carried by a cutter head moved with the wire as the knife operates so that a relatively clean cut is made through the wire without need for interrupting the feed of the wire past the cutting station.

The general object of this invention is to provide an improved type of flying shear of the foregoing character wherein the cutter head and the knife are both driven by a simple single drive mechanism.

A further object of the invention is to provide a flying shear of the foregoing character wherein the drive mechanism for the cutter head and its knife is conveniently located in its entirety above the cutting zone to make it unlikely for the drive mechanism to become contaminated by debris generated during the cutting process and falling by gravity from the cutting zone.

Other objects and advantages of the invention will become apparent from the following description of a preferred embodiment thereof and from the accompanying drawings.

SUMMARY OF THE INVENTION

The invention resides in a flying shear for use in a wire cutting-off machine wherein wire is fed continuously longitudinally of itself in a straight line path past a cutting station fixed relative to the frame of the machine. More particularly, the invention resides in the flying shear having a cutter head supported for reciprocating movement parallel to the path of wire feed, a knife equipped slide carried by the head for reciprocating movement relative to the head along an axis perpendicular to the path of wire feed, a rotatable crank shaft rotatable about an axis fixed relative to the machine frame, and a single lever eccentrically connected to the crank shaft and pivotally connected to both the cutter head and the knife slide so that both the cutter head and the knife slide are reciprocated along their respective axes of reciprocation in response to rotation of the crank shaft.

The invention further resides in the cutter head having a cutoff bushing through which the wire passes, for cooperation with the knife in cutting the wire, and in the knife slide and the drive mechanism for the slide and the cutter head being located above the cutoff bushing.

Other objects and advantages of the invention will be apparent from the following description of the preferred embodiment of the invention and from the drawings forming a part thereof.

DESCRIPTION OF THE PREFERRED EMBODIMENT

Figure 1:
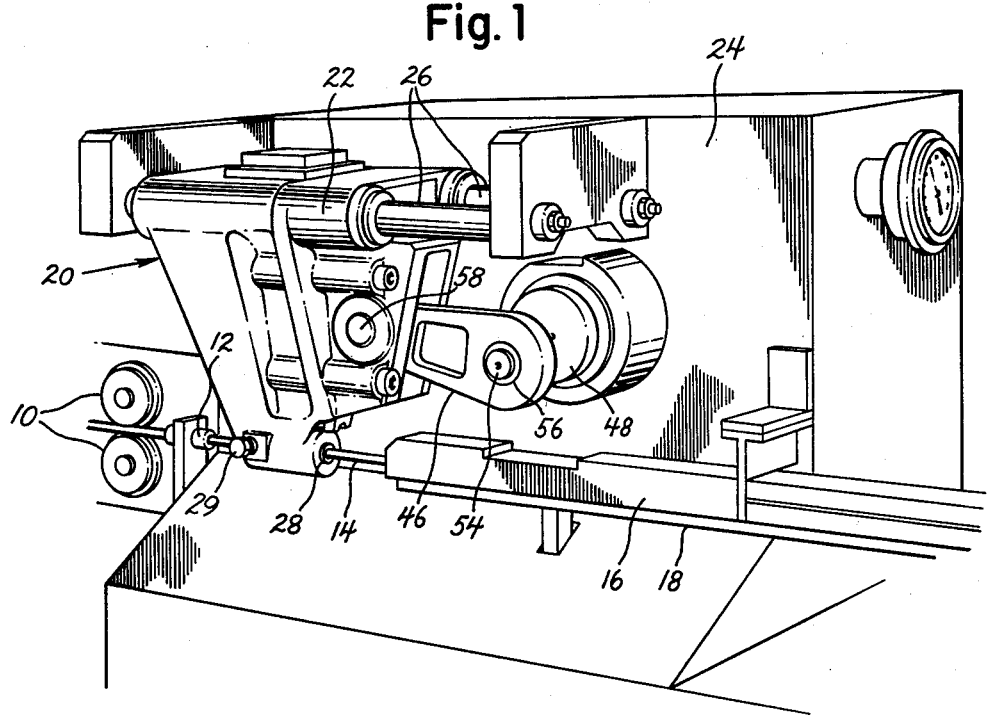
FIG. 1 is a perspective view of a wire cutting-off machine having a flying shear embodying this invention.

The general organization of a wire cutting-off machine embodying the present invention is shown in FIG. 1. Referring to this figure, wire 14 is fed to the cutting station of the machine by a pair of in-feed rollers 10, 10 which receive wire from an associated spool, swift, drawing machine or other supply providing the wire as a very long or substantially continuous length. Between the supply and the in-feed rollers may be a straightener (not shown) for straightening the wire or other devices for performing preliminary operations on the wire. During a given run, the rollers 10, 10 rotate continuously so that the wire is continuously fed to the machine at a steady in-feed speed. Immediately downstream of the in-feed rollers is a wire guide bushing 12 which guides the wire toward the cutting station along a horizontal and substantially straight line path of travel.

The machine may be operated to cut the wire into pieces of various different lengths. Where relatively long length pieces are cut, the machine preferably, as shown in FIG. 1, includes a horizontal receiver 16 which slidably receives and vertically supports the downstream end portion of the wire until it is cut. Included in the receiver 16 is a movable gate or bottom 18. After the length of wire contained in the receiver 16 is cut from the remainder of the wire the bottom 18 is lowered to allow the cut piece to fall by gravity from the receiver to an associated receptacle.

Figure 2:
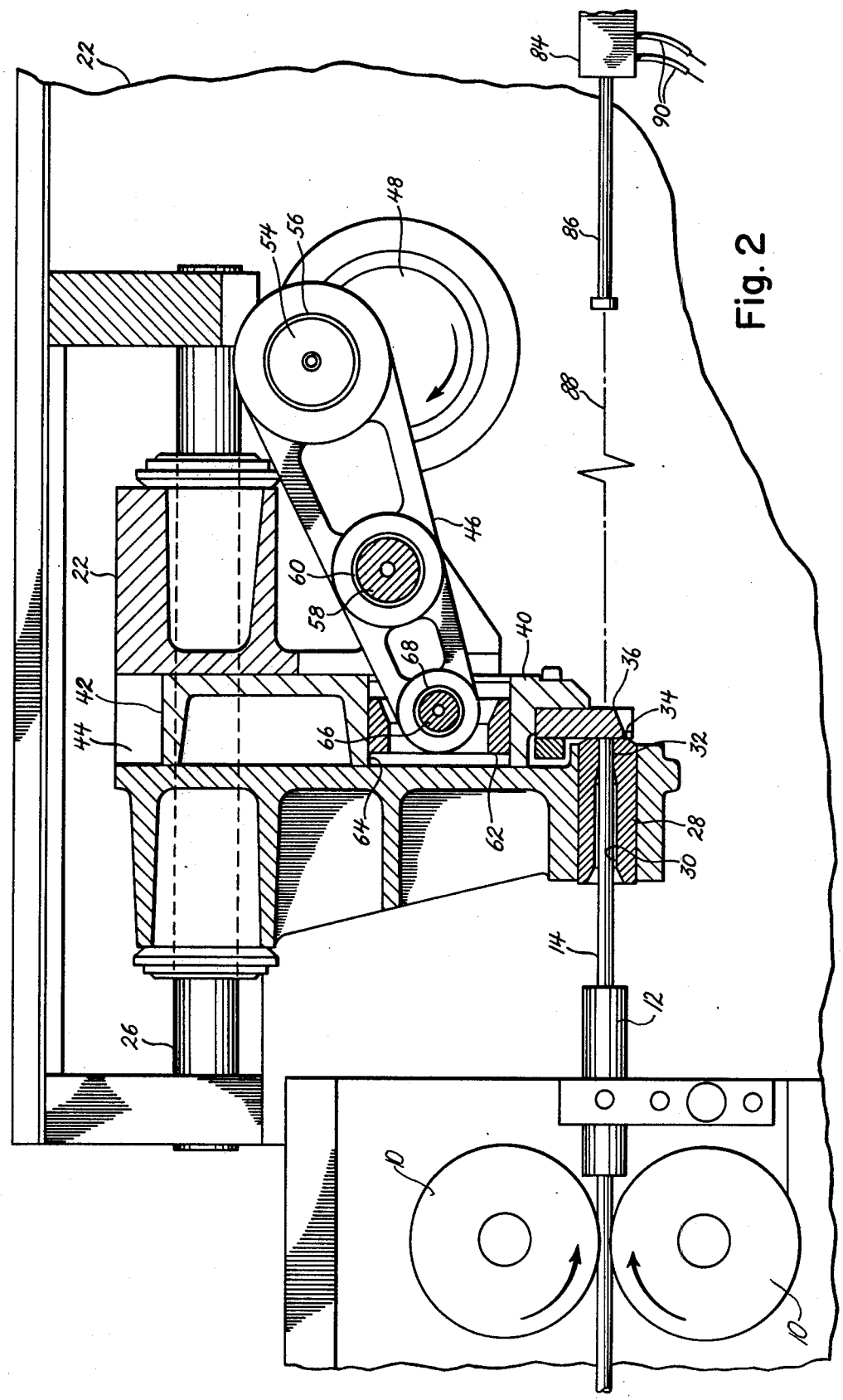
FIG. 2 is a view partly in elevation and partly in vertical section of the wire cutting-off machine of FIG. 1, with the sectional portion of the view being taken generally on a vertical plane containing the axis of the wire.
Figure 3:
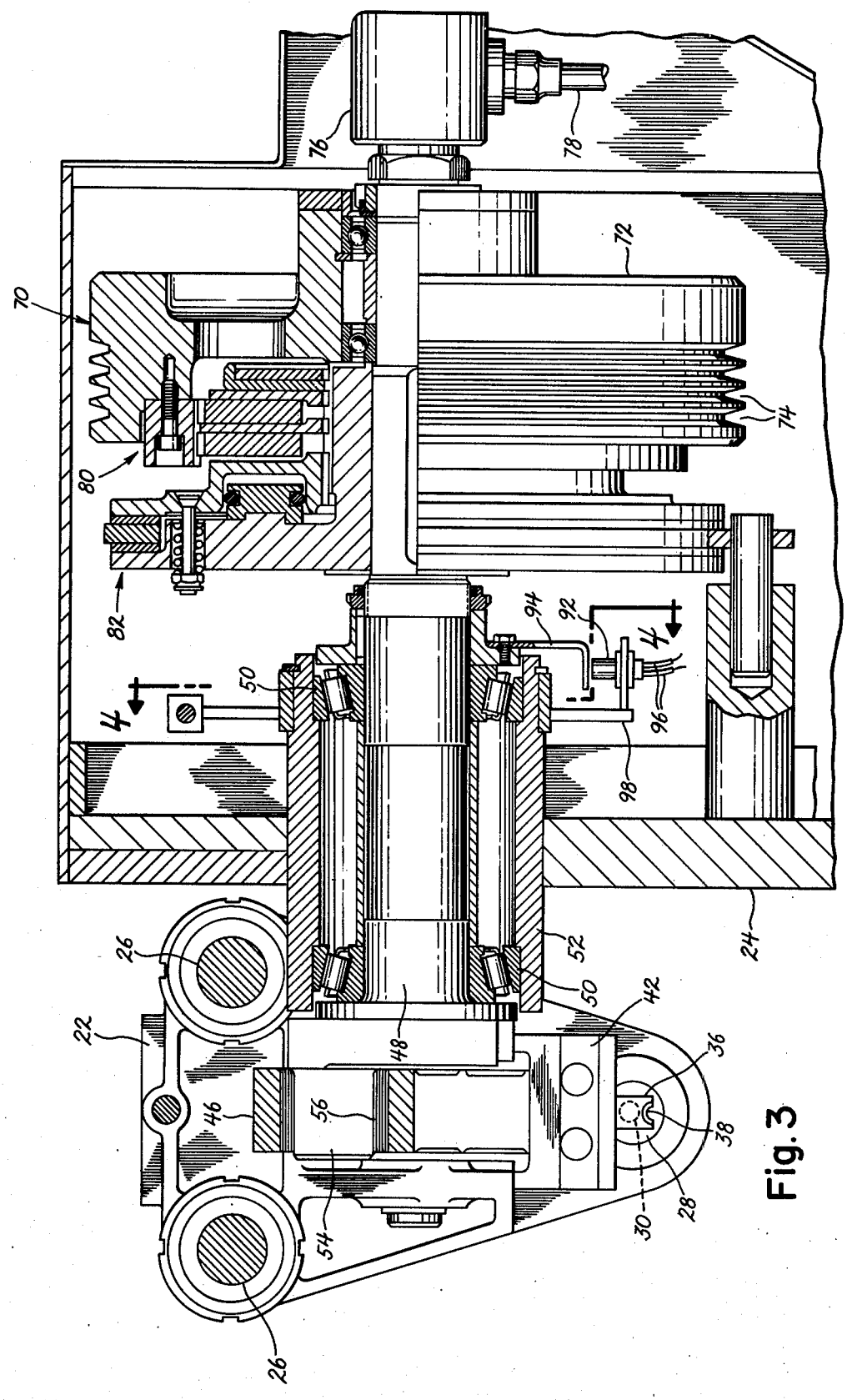
FIG. 3 is a view partly in elevation and partly in section with the sectional portion of the view being taken on the line 3—3 of FIG. 2.
Figure 6:
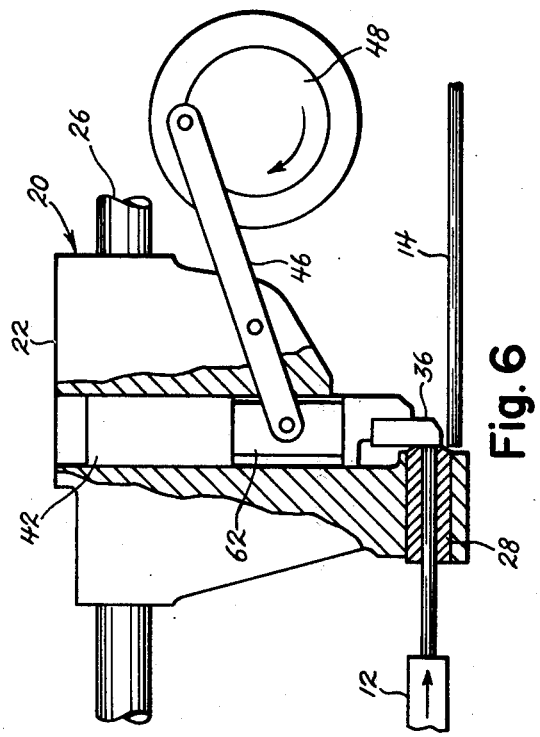
FIGS. 5, 6, 7 and 8 are schematic views generally similar to FIG. 2, showing the parts of the flying shear as positioned at different times in a cutting cycle.
Figure 8:
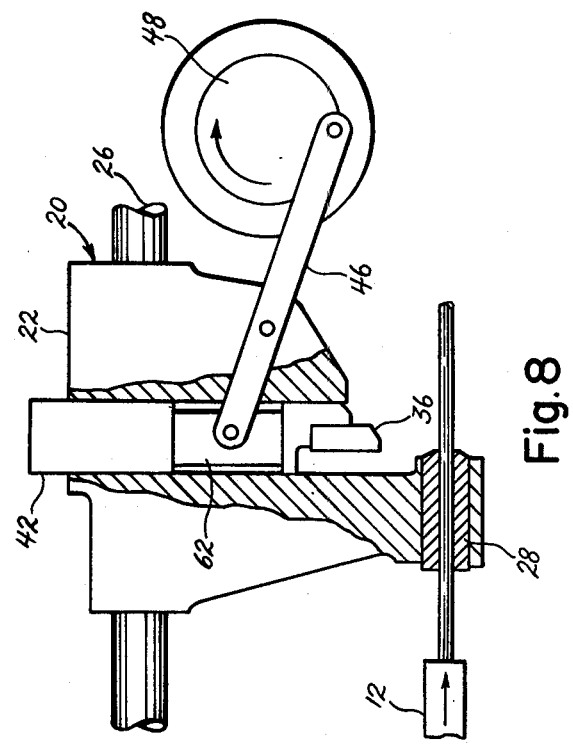

In accordance with the invention, the illustrated machine has at the cutting station a flying shear mechanism, indicated generally at 20, for cutting the wire 14 without stopping, slowing down or otherwise modifying its feed by the in-feed rollers 10, 10. Referring to FIGS. 1, 2 and 3, this flying shear mechanism includes a cutter head 22 supported for reciprocation relative to the machine frame 24 by two parallel rods 26, 26 fixed to the frame and arranged so that the cutter head axis of reciprocation is parallel to the wire feed path. At its lower end the cutter head carries a cutoff bushing 28 having a bore 30 through which the wire 14 passes. The bushing 28 is separate from the remainder of the cutter head 22 and may be replaced with other similar bushings to suit different wire sizes and shapes. It is releasably held in place with respect to the remainder of the cutter head by a locking screw shown at 29 in FIG. 1.

At its downstream end, the bore 30 of the bushing has a portion 32 with a cross-sectional size and shape closely conforming to that of the wire 14 so as to provide a close sliding fit between it and the wire, and at its downstream end the bushing has a vertical end face 34 surrounding the bore 30.

For cutting the wire 14, the cutoff bushing 28 of the cutter head 22 cooperates with a vertically movable knife 36. As shown best in FIG. 3, the knife 36 has a downwardly facing cutting edge 38 which in a cutting operation moves from a raised position past the downstream end of the cutoff bushing bore 30, and adjacent the end face 34, to sever the length of wire located downstream from the end face 34 from the remainder of the wire.

The knife 36 is carried by a knife slide 40 carried by the cutter head 22 for movement relative to the cutter head along a vertical axis perpendicular to the horizontal axis of cutter head reciprocation and to the horizontal axis of wire feed. In particular, the knife slide includes a body 42 which is received in a vertically extending slide recess 44 in the cutter head 22 so as to be restrained to vertical sliding movement relative to the head.

The cutter head 22 is reciprocated back and forth along the rods 26, 26 and the knife slide 40 is reciprocated vertically relative to the cutter head 22 by a single lever 46 eccentrically connected to and driven by a crank shaft 48. As shown best in FIG. 3, the crank shaft 48 is supported for rotation relative to the frame 24 about a horizontal axis perpendicular to the vertical plane containing the path of wire feed by two roller bearing units 50, 50 at opposite ends of a cylindrical housing 52 fixed to and forming part of the frame 24. At its left-hand end, as viewed in FIG. 3, the shaft 48 includes an eccentric journal 54 to which the lever 46 is pivotally connected by a bearing 56 so that the lever is movable relative to the journal about a pivot axis fixed both to the lever and the journal.

The journal 54 and bearing 56 pivotally connect the lever 46 to the crank shaft 48 at one end of the lever. Intermediate its ends the lever is pivotally connected to the cutter head 22, for movement about a pivot axis fixed both to the lever and the cutter head, by a pivot pin 58 fixed to the cutter head 22 and rotatably connected to the lever by a bearing 60.

From the foregoing, and with reference to FIG. 2, it will be understood that as the crank shaft 48 rotates the lever 46 will drive the cutter head back and forth along the horizontal rods 26, 26, and at the same time the left end of the lever 46 will move up and down relative to the cutter head. This up and down lever movement is in turn used to vertically reciprocate the knife slide 40 relative to the cutter head. To achieve a driving connection between the lever and the knife slide 40, the left end of the lever is connected to the knife slide for movement of the lever relative to the slide about a pivot axis fixed vertically to both the knife slide and the lever but capable of moving a slight amount horizontally relative to either the knife slide or the lever to accommodate the horizontal component of the arcuate movement of the lever end. Various different means may be used to provide this type of connection without departing from the invention, and in the illustrated case the connection is provided by a pressure piece 62 received in a slide recess 64 of the knife slide body 42. Along a horizontal axis, the recess 64 has a constant cross-sectional shape and the pressure piece 64 has a complementary cross-sectional shape so as to be restrained by the wall of the recess to sliding movement along a horizontal axis relative to the knife slide. The pressure piece 62 is pivotally connected to the left end of the lever 46 for pivotal movement about a pivot axis fixed to both the pressure piece and the lever by a pivot pin 66 fixed to the pressure piece and rotatably connected to the lever by a bearing 68.

As is seen in FIGS. 1, 2 and 3 the lever 46, knife slide 40 and cutoff bushing are all located generally midway between the two vertical planes containing the axes of the rods 26, 26. Therefore, the cutting force is equalized between the two rods, because of such symmetrical arrangement, and little or no torque is imposed on the rods by the cutter head, thereby minimizing wear.

The drive for the crank shaft 48, as seen in FIG. 3, consists of a pneumatically operated clutch/brake device 70. The crank shaft 48 is the output of the clutch/brake and a flywheel 72 is its input. The flywheel has a set of circumferential grooves 74, 74 for receiving a set of drive belts (not shown) which drive it continuously from an associated motor which also drives the wire in-feed rollers 10, 10 so that the flywheel 72 is driven at a speed directly related to the wire feed rate. The clutch/brake 70 has a normal STOP mode and may be switched to a DRIVE mode by air pressure supplied to it through a rotary air inlet 76 from an air line 78. In the STOP mode, achieved when no operating air pressure is supplied to the device, the clutch portion 80 of the device is set to drivingly disconnect the flywheel 72 from the crank shaft 48 and the brake portion 82 is set to brake or hold the crank shaft 48 stationary relative to the frame 24. Conversely, when the device is in its DRIVE mode, achieved when air pressure is supplied to it through the rotary air inlet 76, the clutch portion 80 is engaged to drivingly connect the flywheel 72 to the crank shaft 48 and the brake portion 82 is released.

During a given run, the clutch/brake 70 may be operated in either one of two ways depending on the length of the pieces desired to be cut from the supply wire. For the cutting of short length pieces, the clutch/brake is held continuously in its DRIVE mode to cause continuous rotation of the crank shaft and continuous operation of the flying shear. In this case, the length of wire cut is determined by preselecting the speed of the flywheel 72 relative to the speed of the infeed rollers 10, 10. That is, the length of each piece is determined by the formula:

$$\text{piece length} = \frac{\text{in-feed speed (feet per minute)}}{\text{cuts per minute}}$$

with the in-feed speed being dependent on the speed (rpm) of the in-feed rollers and the cuts per minute being dependent on the speed (rpm) of the crank shaft. The length of the piece may, therefore, be adjusted by varying the ratio of the in-feed speed to the crank shaft speed as by a variable speed drive between the drive motor and in-feed rollers or a variable speed drive between the drive motor and the flywheel 72. In this cutting of short length pieces, with the shear 20 continuously in operation, the cutter head may not move at exactly the same speed as the wire during the actual cutting operation, but it does move in the same direction as the wire to produce a good quality cut.

In the other alternative way of operating the clutch/brake device, used when cutting relatively longer length pieces, the device, for each cut, is switched from its STOP to its DRIVE and back to its STOP mode to produce one revolution of the crank shaft 48. In this case, use is made of a length detector 84, shown schematically in FIG. 2, having a sensing rod 86 located in the path 88 of wire feed. The sensing rod 86 is normally biased to the position shown in FIG. 2 and is yieldably movable to the right when contacted by the advancing downstream end of the wire. Also, the length detector 84 and its sensing rod 86 may be moved to various different positions along the wire path 88 to provide for the cutting of different length pieces. When the advancing downstream end of the wire contacts the sensing rod 86 the detector produces a signal appearing on the output lines 90, and the sensing rod 86 continues to move to the right along with the wire until the cut is completed and the wire falls from the machine, the sensing rod 86 thereafter returning to the illustrated position of FIG. 2 for use with the next piece.

Figure 4:
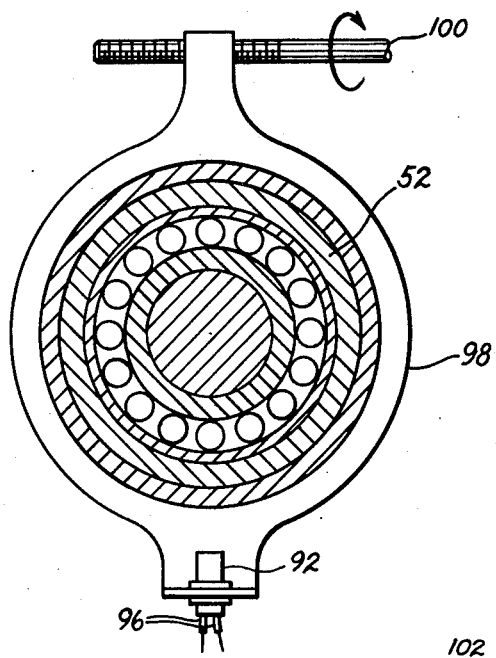
FIG. 4 is a sectional view taken on the line 4—4 of FIG. 3.

The signal which appears on the output lines 90 of the length detector 84 is used to switch the clutch/brake 70 from its STOP mode to its DRIVE mode to initiate one revolution of the crank shaft 48. The switching of the clutch/brake 70 back to its STOP mode at the end of one revolution of the crank shaft is done in response to a STOP signal provided by a proximity switch or detector 92 cooperating with a position indicator in the form of a trigger vane 94 fixed to the crank shaft 48 for rotation therewith, as shown in FIG. 3. The trigger vane 94 rotates with the crank shaft 48 and the proximity switch 92 is located along its path, the detector 92 producing an output signal on its output lines 96 whenever the vane 94 moves into approximate angular alignment with it, the signal on the line 96, therefore, indicating a predetermined angular position of the crank shaft. As seen best in FIG. 4, the proximity detector 92 is carried by a bracket 98 rotatably received on the outside of the cylindrical housing 52. This bracket is threadably connected to an adjustment screw 100 which may be manually rotated to angularly shift the bracket 98 and proximity detector 92 relative to the cylindrical housing 52, thereby adjusting the angular position of the crank shaft at which the detector 92 produces its crank shaft position signal.

Figure 9:
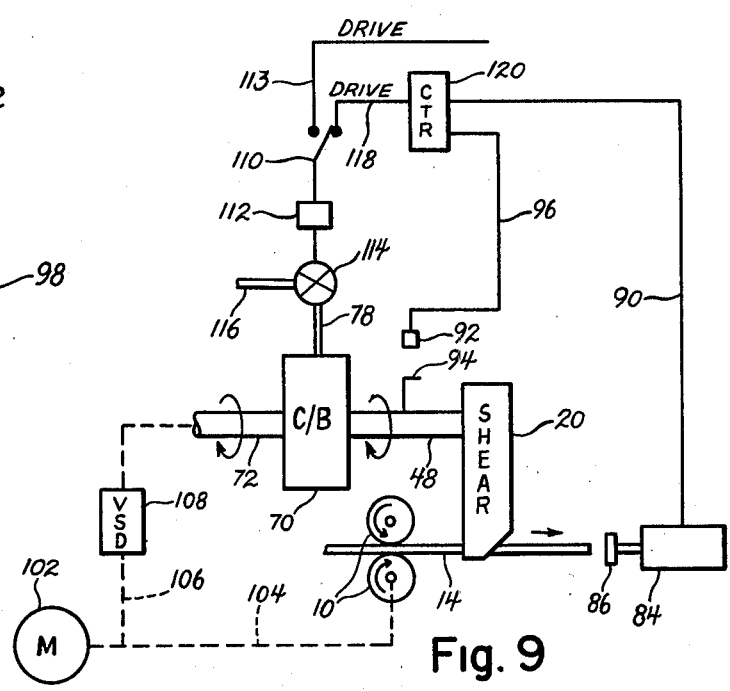
FIG. 9 is a schematic diagram of the control system for the flying shear of FIG. 1.

FIG. 9 shows the control system for the cutting-off machine of FIG. 1. Referring to this figure, the in-feed rollers 10, 10 and the input member or flywheel 72 of the clutch/brake 70 are driven by a common variable speed motor 102. A fixed speed ratio drive train 104 drivingly connects the motor 102 to the in-feed rollers 10, 10, and another drive train 106 including a variable speed device 108 drivingly connects the motor to the clutch/brake flywheel 72, thereby enabling, by adjustment of the variable speed device 108, adjustment of the ratio of the wire in-feed speed to the revolutions per minute of the flywheel 72.

A selector switch 110 may be set to select between continuous and intermittent operation of the clutch/brake 70. For continuous operation of the clutch/brake, as when cutting short length pieces from the supply wire, the switch 110 is set to connect a valve operator 112 to a line 113 which supplies a continuous DRIVE signal. In response to this DRIVE signal the valve operator 112 opens its associated valve 114 to supply pressurized air from a supply line 116 to the clutch/brake to set it to its DRIVE mode in which the flywheel 72 is drivingly connected to the crank shaft 48 to cause continuous repeated operation of the shear 20. With this continuous operation of the shear 20, it will be understood that the length of the pieces cut from the supply wire 14 is controlled by the variable speed device 108. That is, in a given unit of time the in-feed rollers, 10, 10 will feed a given length of wire through the shear and the variable speed device 108 will determine the number of cuts the shear will make on that length of wire during that unit of time.

For intermittent operation of the clutch/brake 70 and shear 20 the switch 110 is set as shown in FIG. 9 to connect the valve operator 112 to the output line 118 of a control circuit 120. The control circuit 120 is essentially a flip-flop device having inputs from the length detector 84 and proximity detector 92. When the wire 14 engages the sensing rod 86, the length detector 84 produces a signal transmitted to the circuit 120 which sets the circuit 120 and produces a DRIVE signal on the output line 118, this in turn causing the valve operator 112 to open the valve 114 to set the clutch/brake 70 to its DRIVE mode, thereby drivingly connecting the crank shaft 48 to the flywheel 72 and bringing the shear 20 into play. After the crank shaft 48 completes approximately one revolution, the vane 94 moves into the region of the proximity detector 92 causing the detector 92 to produce another signal transmitted to the control circuit 130. This signal resets the circuit 120 and removes the DRIVE signal from the line 118, thereby causing the valve operator 112 to close the valve 114, switching the clutch/brake device 70 to its STOP mode and disengaging the flywheel 72 from the crank shaft 48. The crank shaft 48 is thereafter held in a stationary condition unitl a new cycle of operation is initiated by the downstream end of the wire 14 again engaging the sensing rod of the length detector. Of course, during the one revolution of the crank shaft 48 the shear 20 is operated to make one cut in the wire 14. With this type of operation of the machine, the variable speed device 108 is preferably set so that during the time that the knife 36 is actually performing the wire cutting operation, the cutter head 22 is moving at a speed equal to the in-feed speed of the wire to thereby produce a very high quality cut.

Figure 5:
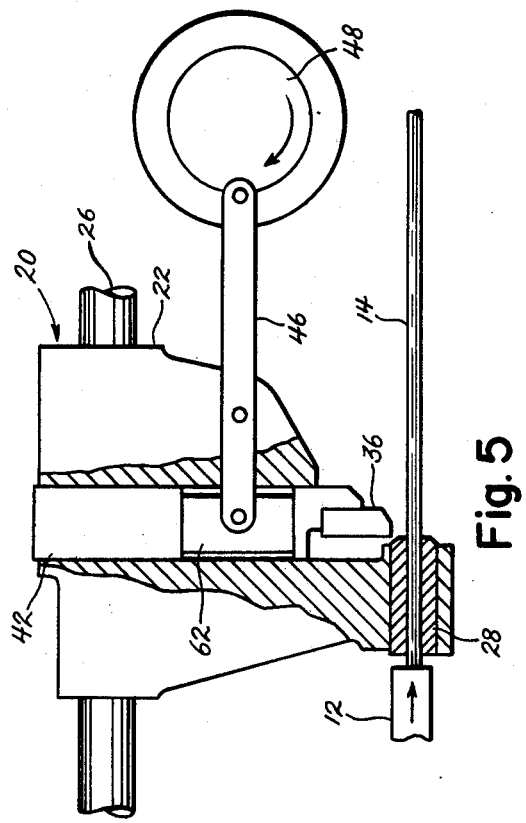
Figure 7:
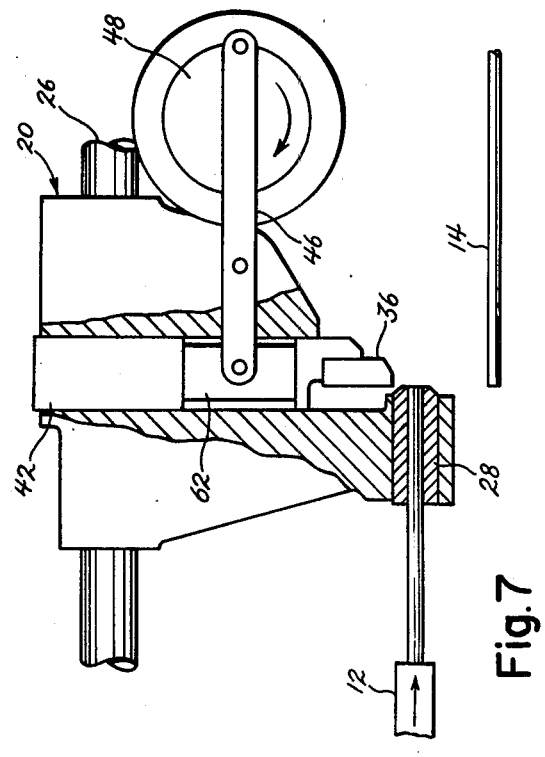

FIGS. 5, 6, 7 and 8 show the positions occupied by the major parts of the flying shear 20 at different intervals of one cutting cycle taken in sequence. FIG. 5 may be taken to be the start of a cutting cycle with the lever 46 positioned to hold the cutter head 22 at its left-most position with the knife 36 of the knife slide 42 slightly raised above the wire 14. During the next 90° of crank shaft rotation, the cutter head 22 is moved to the right, in the same direction as the wire 14, and the knife slide 42 is moved downwardly to drive the knife 36 past the cutoff bushing 28 to cut the downstream portion of the wire from the remaining supply. During the next 90° of crank shaft rotation the parts move to the position of FIG. 7 with the cutter head shifting to its right-most position and with the knife 36 being returned to a raised position. During the next 180° of crank shaft rotation the parts are returned to the initial position of FIG. 5, passing on the way the state shown in FIG. 8.

After a piece or length of wire is cut from the supply it thereafter drops by gravity to a receptacle or other collecting means. It will also be noted that the construction and arrangement of the parts of the flying shear is such that basically all of the parts are located above the cutoff bushing 28. Therefore, any chips or other debris generated by the cutting process will tend to fall harmlessly away from the shear with little likelihood of causing any contamination problems.

As described above, a single motor 102 is used to drive both the shear 20 and the infeed rollers 10, 10. As an alternative to this two separate motors running at the same speed or at some fixed speed ratio could be used, one for driving the shear through the drive train 106 and the other for driving the infeed rollers 10, 10 through the drive train 104. Also, the variable speed device 108 could be placed in the drive train 104 rather than the drive train 106, or two variable speed devices may be used if desired—one in the drive train 106 and the other in the drive train 104.

I claim:

1. In a wire cutting-off machine having a frame and a feeding means for feeding wire longitudinally of itself in a straight line path continuously past a cutting station fixed relative to said frame, an improved flying shear mechanism for repeatedly cutting said wire without interrupting its feed by said feeding means, said flying shear comprising: two spaced apart guide rods located in a common horizontal plane and each parallel to said straight line path of wire feed, a cutter head mounted on said guide rods for horizontal reciprocation therealong, said head having a horizontal bore located below said guide rods through which said wire passes, a knife slide carried by said head for vertical reciprocation relative thereto, said slide having a knife portion which moves past one end of said bore to cut said wire as said slide is moved vertically between two different positions relative to said head, a crank shaft rotatable about a horizontal axis fixed relative to said frame and perpendicular to the vertical plane containing said straight line path of wire feed, a lever, means pivotally connecting said lever eccentrically to said crank shaft at one point along the length of said lever, means pivotally connecting said lever to said cutter head at another point along the length of said lever so that said head is horizontally reciprocated along said guide rods as said shaft rotates, and means pivotally connecting said lever to said knife slide at still another point along the length of said lever so that said slide is also driven vertically between said two different positions relative to said head as said drive shaft rotates, said lever and said knife slide and said bore all being located generally midway between the two vertical planes containing the axes of said two guide rods, said lever being connected at one of its ends to said crank, at the other of its ends to said knife slide, and at a point intermediate its ends to said cutter head, said means pivotally connecting said lever eccentrically to said crank shaft being such that the pivot axis of said lever relative to said crank shaft is fixed to both said lever and said crank shaft, said means pivotally connecting said lever to said cutter head being such that the pivot axis of said lever relative to said head is fixed both to said lever and said head, and said means pivotally connecting said lever to said knife slide including a pressure piece, means supporting the pressure piece on said knife slide for movement relative to said slide solely along an axis parallel to said path of wire feed, and means pivotally connecting said lever to said pressure piece for movement of said lever relative to said pressure piece about a pivot axis fixed both to said lever and said pressure piece, said means supporting said pressure piece on said knife slide including means defining a slide cavity in said slide having a constant cross-sectional size along an axis parallel to said path of wire feed, and said pressure piece being received in said slide cavity and having a complementary cross-sectional shape so as to be restrained to sliding movement relative to said slide along said axis of said cavity.

2. In a wire cutting-off machine having a frame and a feeding means for feeding wire longitudinally of itself in a straight line path continuously past a cutting station fixed relative to said frame, an improved flying shear mechanism for repeatedly cutting said wire without interrupting its feed by said feeding means, said flying shear comprising: a cutter head, means supporting said head for reciprocation relative to said frame along a first axis parallel to the straight line path of wire feed, said head having a horizontal bore through which said wire passes, a knife slide carried by said head for vertical reciprocation relative thereto, said slide having a knife portion which moves past one end of said bore to cut said wire as said slide is moved vertically between two different positions relative to said head, a crank shaft rotatable about a horizontal axis fixed relative to said frame and perpendicular to the vertical plane containing said straight line path of wire feed, a lever, means pviotally connecting said lever eccentrically to said crank shaft at one point along the length of said lever, means pivotally connecting said lever to said cutter head at another point along the length of said lever so that said head is horizontally reciprocated along said first axis as said shaft rotates, and means pivotally connecting said lever to said knife slide at still another point along the length of said lever so that said slide is also driven vertically between said two different positions relative to said head as said drive shaft rotates, said lever being connected at one of its ends to said crank, at the other of its ends to said knife slide, and at a point intermediate its ends to said cutter head, said means pivotally connecting said lever eccentrically to said crank shaft being such that the pivot axis of said lever relative to said crank shaft is fixed to both said lever and said crank shaft, said means pivotally connecting said lever to said cutter head being such that the pivot axis of said lever relative to said head is fixed both to said lever and said head, and said means pivotally connecting said lever to said knife slide including a pressure piece, means supporting the pressure piece on said knife slide for movement relative to said slide solely along an axis parallel to said path of wire feed, and means pivotally connecting said lever to said pressure piece for movement of said lever relative to said pressure piece about a pivot axis fixed both to said lever and said pressure piece, said means supporting said pressure piece on said knife slide including means defining a slide cavity in said slide having a constant cross-sectional size along an axis parallel to said path of wire feed, and said pressure piece being received in said slide cavity and having a complementary cross-sectional shape so as to be restrained to sliding movement relative to said slide along said axis of said cavity.

* * * * *